Patented May 12, 1936

2,040,671

UNITED STATES PATENT OFFICE 2,040,671

PRESSURE MOLDABLE INSULATING COMPOSITIONS AND METHOD OF MAKING

Linwood T. Richardson, Milwaukee, Wis., assignor to Cutler-Hammer, Inc., Milwaukee, Wis., a corporation of Delaware No Drawing. Application November 9, 1933, Serial No. 697,250

11 Claims. (Cl. 106—15)

This invention relates to improvements in plastic insulation molding compositions and methods of making the same.

The ordinary cold-moldable plastic insulating composition materials (usually comprising an asphaltic or bituminous binder and a fibrous filler) have a tendency to stick to the surfaces of the steel die members when such materials are subjected to pressure during the molding operation. This results in an increase in the percentage of defective or scrap parts produced during pressing, due to flaws where spots of material adhere to the die member or members and are pulled out of the molded piece. The number of distorted and/or cracked pieces is likewise increased due to this sticking characteristic of the materials, which characteristic is accentuated by the relatively high molding pressures employed, and the frequent necessity for cleaning the die cavities considerably reduces the rate at which the insulation articles may be molded.

In attempting to overcome the aforementioned difficulties it has heretofore been proposed to brush the molding surfaces of the dies with a lubricant such as water, or to dust the mold prior to molding with a dusting powder such as metallic soap, talc, etc. Similarly it has been proposed to intimately mix the lubricant, such as a grease, an oil, a metallic soap, water, or an aqueous solution with the molding material. The brushing or dusting of die surfaces is time-consuming, and to obtain a satisfactory rate of pressing it has heretofore been considered a necessity in the molding of most parts to incorporate the lubricant in the molding material whereby the brushing operation is avoided. However, the incorporation of a lubricant in the material results in a decrease in strength of the final heat-indurated or cured part, and also results in a less satisfactory surface finish due to the increased porosity of the molded material.

It is an object of my invention to overcome all of the difficulties aforementioned.

Another object is to provide a plastic insulation molding composition which is inherently non-sticking with respect to the die members wherefore the same may be molded without the use of a lubricant.

Another object is to provide novel methods of making or preparing plastic insulation molding compositions having the desirable characteristics aforementioned.

Other objects and advantages of the invention will hereinafter appear.

I have discovered that a plastic insulation molding material can be produced which is inherently non-sticking with respect to the molding dies, wherefore the same is adaptable for molding without the use or addition of a lubricant. This non-sticking property or characteristic is attained by the addition of a relatively large quantity of free fatty acid; as, for instance, stearic or oleic acid. Although in practice I prefer to employ oleic acid, I have found that comparable results may be obtained by the use of various other vegetable or animal fatty acids, such as corn oil fatty acid, peanut oil fatty acid, etc., or by the use of mixtures of such fatty acids.

In carrying out my invention I prefer to provide a binder containing the specified ingredients in the following proportions by weight:

| | Parts |
|---|---|
| Stearin pitch | 100 |
| Oleic acid | 100 |
| Gilsonite | 100 |
| Solvent (gasoline) | 60 |

In preparing this binder the stearin pitch is heated to about 450 degrees F. in a suitable tank or container, and thereafter the gilsonite is added. The mixture is stirred or agitated and the aforementioned temperature is maintained until the gilsonite is dissolved. The oleic acid is then added. The mixture is then cooled or allowed to cool to about 150 degrees F., whereupon the solvent is added with stirring.

Other compositions may of course be employed, provided that the same shall include a relatively large proportion of free fatty acid. For instance, it is possible to provide a non-sticking plastic insulation molding material utilizing a binder prepared from, say, 100 parts of gilsonite and 100 parts of free fatty acid, with about 40 parts of a suitable solvent, such as gasoline. I have found in practice that for molding certain types of articles the proportionality of free fatty acid in the binder may be considerably reduced (say, to as low as 80 parts for each 100 parts of gilsonite) without sacrificing the desirable non-sticking characteristics herein contemplated.

Although I prefer to employ gilsonite because it is a very pure form of asphaltum, it will of course be apparent to those skilled in the art that other forms of asphaltum may be employed if desired.

After preparation of a binder including a relatively large proportion of free fatty acid as aforedescribed, I may prepare a plastic molding mixture containing ingredients in substantially the following proportions by weight.

| | Parts |
|---|---|
| Binder, as above described (preferably 170 parts) | 160 to 190 |
| Asbestos (comminuted) | 750 |
| Sulphur (preferably 90 parts) | 30 to 90 |
| Coal tar oil | 3 |
| Solvent (gasoline) | 30 |

Such ingredients are intimately mixed in a dough mixer or other kneading machine; the resulting mass is then disintegrated in any well known manner. The disintegrated material may then be re-balled or kneaded in a so-called "pony" mixer to increase the density thereof, and the re-balled material, which is in the form of small pellets or granules, screened in the usual manner. Evaporation of any excess of solvent in the material is then effected or permitted to render the same suitable for pressing.

The material thus prepared may be molded in granular or powder form in the usual cold-molding dies,—or such granular material may be treated by extrusion and blanking thereof in the manner described and claimed in my Patent No. 1,944,464, dated January 23, 1934. After the material has been molded to provide articles of the desired shape, the latter are subjected to the usual prolonged heat treatment for curing.

Articles molded from materials prepared in accordance with my invention have a uniformly smooth and brilliant natural surface finish, which is in nowise marred by the aforementioned heat-indurating treatment. There is no tendency of the molded articles to stick to the dies, wherefore wastage of time and materials is minimized in practicing my invention. Moreover, there is substantially no increase in the cost of the ingredients nor in the cost of preparation of my molding mixture as compared with the molding mixtures heretofore employed, and hence the reduction in the percentage of defective molded pieces and the consequent increase in the rate of production of the pieces result directly from the novel and useful characteristics of my molding mixture.

What I claim as new and desire to secure by Letters Patent is:

1. A cold-moldable and heat-induratable insulating composition comprising a mixture of substantially equal parts by weight of asphaltum and oleic acid, said composition being substantially free from any tendency to adhere to the molding dies.

2. A cold-moldable plastic insulating composition comprising a mixture of substantially equal parts by weight of asphaltum, stearin pitch and free fatty acid, said composition being substantially free from any tendency to adhere to the molding dies.

3. A cold-moldable and heat-induratable plastic insulating composition including a binder comprising an intimate mixture of substantially equal parts by weight of gilsonite, stearin pitch and oleic acid, said composition being free from any tendency to adhere to the molding dies.

4. A cold-moldable non-sticking plastic insulating composition including a binder comprising an intimate mixture of substantially equal parts by weight of gilsonite, stearin pitch and oleic acid, and a solvent.

5. A plastic insulation molding mixture including a binder comprising substantially equal weights of gilsonite, stearin pitch and oleic acid, and a solvent; 160 to 190 parts of said binder being intimately mixed with 750 parts of asbestos, 30 to 90 parts of sulphur, 3 parts of coal tar oil, and 30 parts of gasoline.

6. A non-sticking plastic insulation molding mixture comprising approximately 170 parts by weight of a binder consisting of stearin pitch, gilsonite and oleic acid in substantially equal proportions, and a solvent; 750 parts of asbestos; 90 parts of sulphur; 3 parts of coil tar oil; and 30 parts of gasoline.

7. In the method of treating a cold-moldable and heat-induratable composition comprising a bituminous binder and a fibrous filler, said composition having a tendency to stick to the mold, the step which consists in adding to and effecting a solution with approximately 260 parts by weight of the other ingredients of the binder about 100 parts by weight of oleic acid, whereby said tendency to stick to the mold is minimized.

8. In the method of preparing a cold-moldable plastic insulating mixture which is substantially non-sticking with respect to the usual high-pressure cold molding dies, the steps which consist in heating a quantity of stearin pitch, adding thereto an equal quantity of gilsonite and an equal quantity of oleic acid, partially cooling the solution and adding thereto a suitable solvent to provide a binder, intimately mixing with about 170 parts by weight of said binder 750 parts of comminuted asbestos, 90 parts of sulphur, 3 parts of coal tar oil, and 30 parts of gasoline as a solvent, then disintegrating the mixture, re-balling the same to increase the density thereof, and then effecting evaporation of any excess of solvent.

9. The method of making a non-sticking, cold-moldable and heat-induratable insulating material, which comprises mixing under heat substantially equal parts by weight of stearin pitch, asphaltum and a free fatty acid, partially cooling said mixture, and then adding thereto a suitable solvent.

10. The method of making a non-sticking, cold-moldable plastic insulation composition, which comprises mixing at about 450 degrees F. substantially equal quantities by weight of stearin pitch and gilsonite, maintaining said temperature until the gilsonite is dissolved, adding a third equal quantity of oleic acid, cooling the mixture to 150 degrees F. and adding thereto a quantity of gasoline equal to substantially twenty per cent of the weight thereof to provide a binder, thoroughly mixing said binder with suitable proportions of comminuted asbestos, sulphur, coal tar oil and gasoline, then disintegrating, re-balling and screening the resulting material, and then effecting evaporation of the excess solvent to render the material suitable for molding.

11. The method of making a cold-moldable and heat-induratable insulation composition which is substantially non-sticking with respect to the usual high-pressure cold molding dies, which comprises heating about 100 parts by weight of stearin pitch to a temperature of approximately 450 degrees F., adding thereto about 100 parts of gilsonite with stirring and maintaining said temperature until the gilsonite is dissolved, then adding 100 parts of oleic acid, then cooling the mass to approximately 150 degrees and adding 60 parts of gasoline with stirring, whereby a binder is provided; mixing in a dough mixer 170 parts of said binder, 750 parts of comminuted asbestos, 90 parts of sulphur, 3 parts of coal tar oil and 30 parts of gasoline, then disintegrating, re-balling and screening said mixture, and then effecting evaporation of the excess of solvent prior to molding of the mixture.

LINWOOD T. RICHARDSON.